July 17, 1956  C. C. BAUERLEIN  2,754,999
THROW-AWAY TYPE DISPENSER
Filed May 8, 1953  2 Sheets-Sheet 1

Inventor
Carl C. Bauerlein
By Hill Sherman Meroni Gross & Simpson
Attys

July 17, 1956  C. C. BAUERLEIN  2,754,999
THROW-AWAY TYPE DISPENSER
Filed May 8, 1953  2 Sheets-Sheet 2
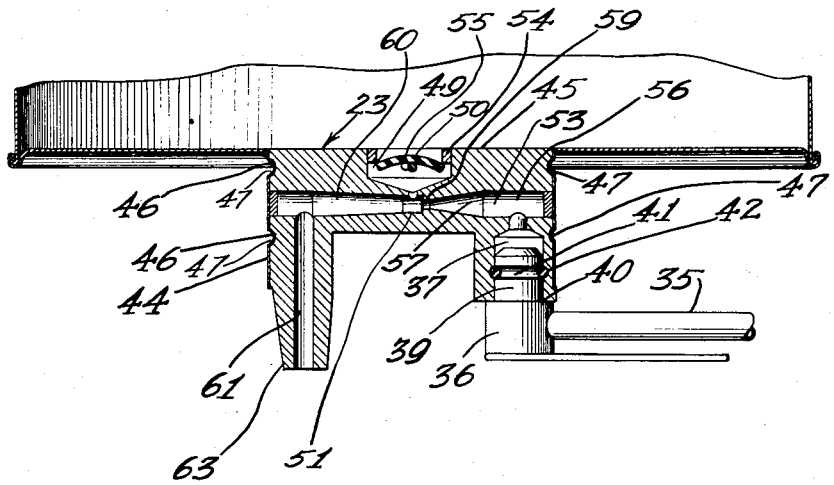
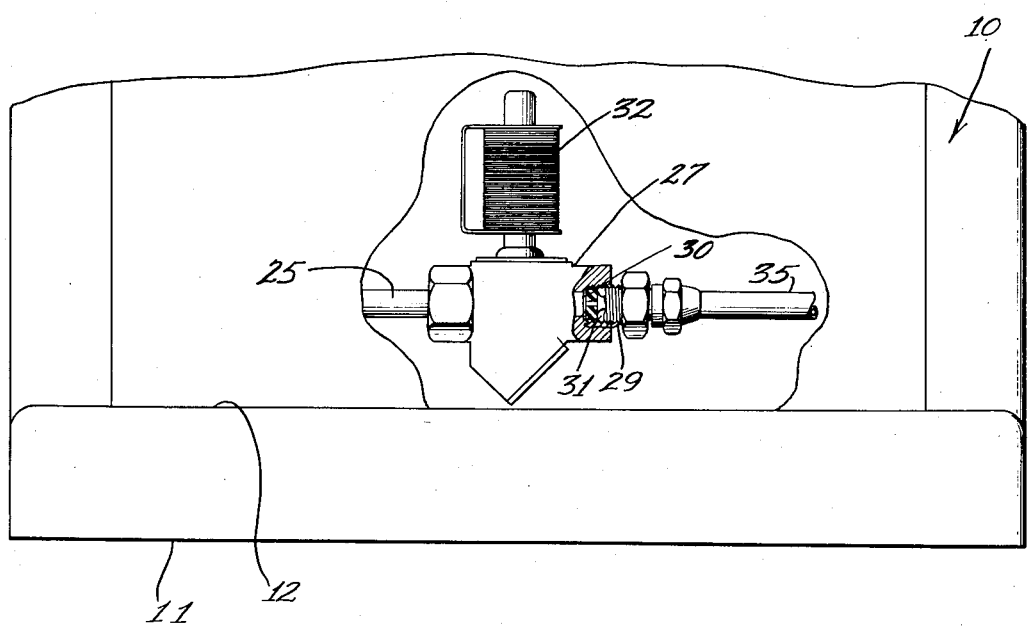
Inventor
Carl C. Bauerlein

United States Patent Office 2,754,999
Patented July 17, 1956

2,754,999
THROW-AWAY TYPE DISPENSER

Carl C. Bauerlein, Mukwonago, Wis., assignor to The Dole Valve Company, Chicago, Ill., a corporation of Illinois Application May 8, 1953, Serial No. 353,739

3 Claims. (Cl. 222—129.2)

This invention relates to improvements in dispensers, and more particularly relates to such dispensers as dilute and dispense fluids or concentrates.

An object of my invention is to provide a novel form of container for concentrates and particularly concentrated milk and the like, having a proportioning and dispensing valve formed as a part of the container and thrown away with the container when empty.

Another object of my invention is to provide a simple and efficient cheaply constructed dispensing valve for dispensing and mixing concentrates directly from the ordinary can containing the concentrate and forming an integral part of the can.

A still further object of my invention is to provide a novel and simple form of dispensing valve for concentrates economical to manufacture and forming a part of the container for the concentrate, and retaining the concentrate therein, but dispensing the concentrate therefrom when connected with a source of pressure.

Still another form of my invention is to provide a container particularly adapted to contain concentrated milk and the like, in which the container may be inserted within a dispenser for diluting and dispensing the milk concentrates, and having a flow characterizing and dispensing valve as an integral part thereof, connectible with a diluting water connection of a dispenser, by placing the container within the dispenser.

These and other objects of my invention will appear from time to time as the following specification proceeds and with reference to the accompanying drawings therein:

Figure 2 is a transverse sectional view taken through the container for the concentrate and showing the proportioning and dispensing valve in transverse section and connected to a source of diluting fluid under pressure; and Figure 3 is a fragmentary front end view of dispenser with certain parts thereof broken away in order to show the shut-off valve and the flow control for the diluting fluid.

Figure 1:
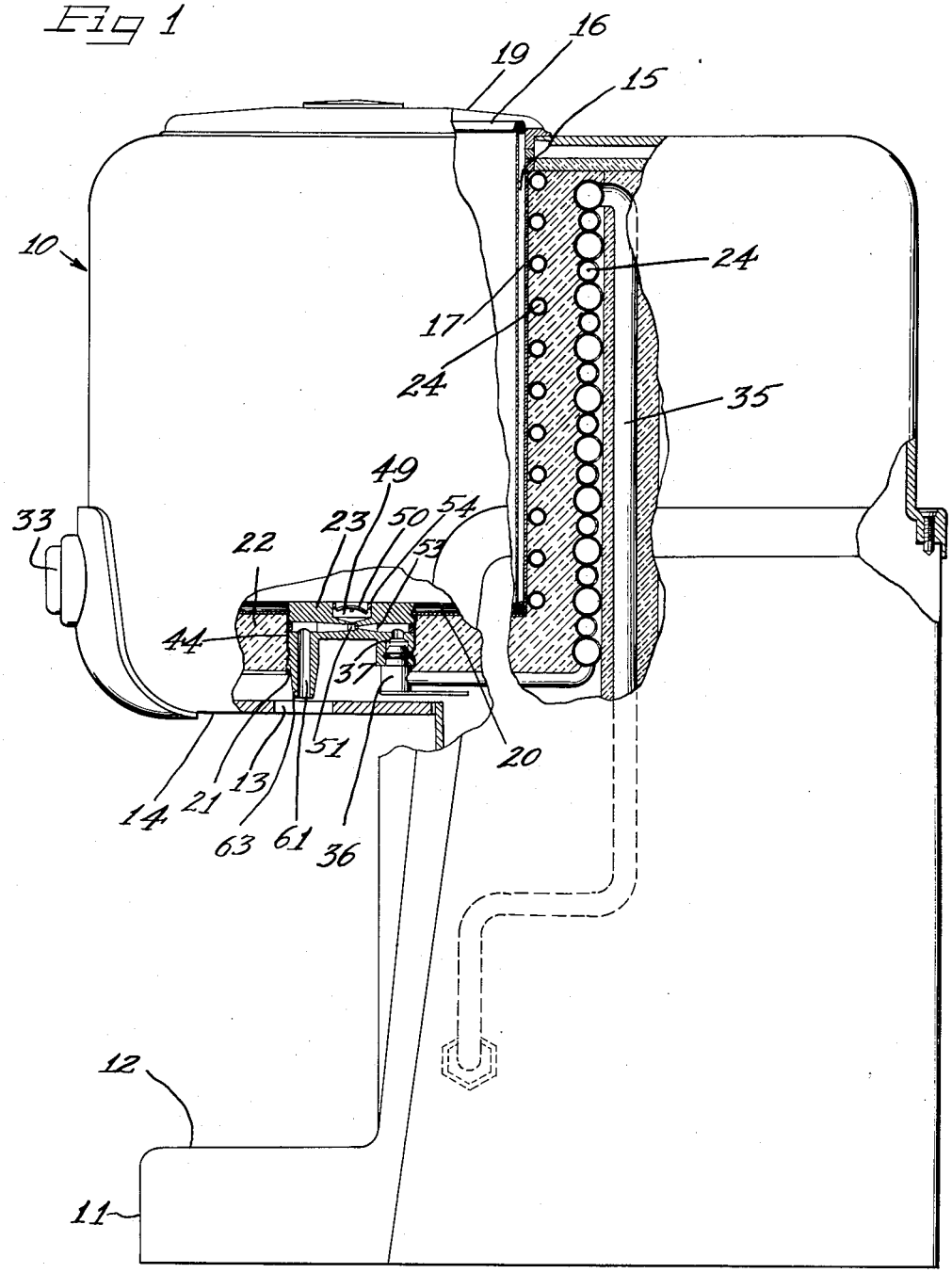
Figure 1 is a view in side elevation of a dispenser constructed in accordance with my invention with certain parts thereof broken away and certain other parts shown in vertical section, in order to more clearly illustrate the manner in which the container and dispensing valve is inserted within the dispenser, and connected with a source of diluting fluid under pressure.

In Figure 1 of the drawings, I have shown a dispenser for diluting and dispensing concentrates, and particularly for dispensing concentrated milk directly from the container or can in which the milk is supplied. This dispenser may include a cabinet or casing having a base 11 which may be mounted on a counter and may have a recessed lower portion or shelf 12 to receive a glass (not shown) in alignment with an opening 13 in a bottom wall 14 of the casing 10, through which the mixed drink may flow.

The casing 10 is shown as having a chamber or tank 15 therein, forming a receptacle for a concentrate can 16. As herein shown the chamber 15 has a cylindrical wall 17 spaced inwardly from the concentrate can 16, a distance sufficient to accommodate the can to be inserted and removed therefrom and has a cover 19. The chamber 15 also has a bottom 20 having a cylindrical opening 21 leading therethrough and through an insulating medium 22, surrounding said container within which fits a proportioning and dispensing valve 23, herein shown as forming a part of the can 16 and as being a downward continuation thereof.

The chamber 15 may be cooled by refrigerating coils 24 encircling said chamber. The inside of said chamber may be made from a corrosion-resistance material, such as stainless steel, which may act as a conductor of cold, to maintain the concentrate cold within the can 16 when the refrigerating unit is shut off.

The refrigerating coils 24 may be connected with a compressor, and condenser (not shown) of a refrigerating unit, which may be mounted outside of the casing 10, or inside of said casing on the base 11 within the side walls of the casing.

A supply pipe 25 for diluting fluid, which may be water, may enter the casing 10 through the wall thereof adjacent the lower end thereof and may be connected at its delivery end with a shut-off valve 27, herein shown as being at the front of the casing 10 and extending transversely thereof, just above the base 11 and inwardly of the shelf 12. The valve 27 may be a solenoid controlled fluid pressure operated valve of a well known form, and is not herein shown or described in detail except insofar as to show a fitting 29 threaded within the delivery end thereof. The fitting 29 is shown as having an annular resilient flow control member 30 contained therein and seated against a shouldered portion 31 of said fitting. Various forms of flow control members may be substituted for the flow control member 30, to accommodate the valve to deliver the required uniform volume of diluting water at the desired pressure, regardless of variations in pressure of the water at the source. The flow control member 30 is herein shown as being a resilient flow control washer, similar to that shown and described in Patent #2,389,134, which issued to Clyde A. Brown on November 20, 1945, and is no part of my present invention, so need not herein be shown or described in detail.

A coil 32 for the solenoid controlling operation of the valve 27, encircles an armature (not shown) of the valve and may be energized upon the pressing of a push button 33 at the front face of dispenser, to open the valve to supply water at the desired pressure, for aspirating and scavenging the concentrate from the can 16 and for mixing the concentrate with the desired quantity of diluting fluid, to provide a final drink of the desired consistency. A pipe 35 is connected to and leads from the fitting 29 and extends upwardly within the casing 10 and is shown as being coiled about the container 15 concentric with and above and below the outer refrigerating coils 24. The pipe 35 is shown as being coiled downwardly from the top to the bottom of the chamber 15. The lower end of said pipe extends inwardly along and beneath the bottom of the chamber 15 and has a fitting 36 mounted on its end. The fitting 36 extends upwardly within the opening 21 for registry with a socket 37, formed in the proportioning and dispensing valve 23.

As shown in detail in Figure 2, the fitting 36 extends at right angles to the pipe 35, and has an upper reduced diameter male outlet portion 39 terminating at its lower end into a shoulder 40 abutting the bottom wall of the part of the valve defining the socket 37. The outlet portion 39 is shown as having a recess 41 extending therearound, to receive an O ring 42, which may be mounted therein and have cooperation with a similar recess formed in the inner wall of the socket 37. The fitting 36 opens directly in alignment with the socket 37, and when the can 16 is placed downwardly within the container 15 and the valve 23 comes into registry with the opening 21, the socket 37 will fit over and be moved into engagement with the male outlet portion 39 as the can is moved downwardly within the dispenser.

Referring now in particular to the proportioning and dispensing valve 23, forming a part of the can 16, the can 16 is shown as having a metal collar 44 depending therefrom, fitting within the opening 21 in the bottom of the container 15, and surrounding the mixing and dispensing valve 23.

The mixing and dispensing valve 23 is herein shown as comprising a generally cylindrical valve body 45 having vertically spaced recesses 46, 46 extending around the wall thereof and engaged by inwardly rolled beads 47, 47 rolled in the collar 44 into engagement with recesses 46, 46 as the dispensing valve is positioned within said collar.

The valve body 45 may be molded from one of the well known thermo-plastic materials, or from glass, or from any other suitable material. The upper face of the valve body 45 is shown as being flush with the bottom of the can 16 and as having a central chamber 49 recessed therein and having a resilient wafer 50 mounted therein and forming a check valve. The bottom of the chamber 49 is in a form of an inverted cone and is shown as communicating at the apex of the cone with a vacuum chamber 51 of a venturi 53.

The wafer or disk 50 may be made from rubber, an elastomer or the like and is carried within a cage 54, recessed within the chamber 49 and having a rod 55 extending across the bottom thereof, forming a support for said wafer. As herein shown, the flexible wafer 50 extends across the rod 55 and the periphery abuts the bottom of the collar 54 along its outer edge with sufficient force to retain the concentrate within the can 16, during transportation of the can for use, but flexes downwardly upon the creation of a vacuum in the vacuum chamber 51 to accommodate the concentrate to be aspirated therein.

The socket 37 communicates with a transverse passageway 56, leading to the base of a truncated cone-like passageway 57 forming the upstream side of a venturi 53. The apex of the passageway 57 communicates with a throat 59, which is connected with the vacuum chamber 51. An inverted truncated cone-like passageway 60 leads from the vacuum chamber 51 and communicates with a vertical, downwardly extending passageway 61, formed in the form of a dispensing spout 63. The spout 63 is shown as being aligned with the center of the opening 13 in the bottom wall 14 of the casing 10 when the can 16 is in position within the chamber 15.

Assuming the can 16 has been opened or pierced at its top in a usual manner, water under pressure entering the venturi 53 through the socket 37 from the pipe 35 and the fitting 36 passes through the venturi 53, and the increased velocity thereof flowing through the throat 59 creates a resulting drop in pressure at the downstream side of said throat and a vacuum in the vacuum chamber 51. This will draw the wafer 50 downwardly out of engagement with the bottom of the casing or collar 54 and aspirate the concentrate from the can 16, mixing it with a definite proportion of wafer and discharging it through the spout 63, and opening 13.

It may be seen from the foregoing that an inexpensive proportioning and dispensing valve has been provided, which is part of an ordinary can containing the concentrate, and that this valve is positioned within the concentrate dispenser merely by placing the can within the dispensing chamber therefor.

It may further be seen that when the can 16 is empty, the can with the proportioning and dispensing valve fixed thereto are a unit and are cheap enough in construction that they may readily be thrown away, making it unnecessary to clean the valve and providing a sanitary and efficient carrying and dispensing container and valve.

It will be understood that modifications and variations may be effected without departing from the scope of the novel concepts of the present invention.

I claim as my invention:

1. As an article of manufacture, a throw-away concentrate dispensing container having an open bottom having a collar extending outwardly from the bottom of said container, the inner margin of which defines the open portion of said bottom, a unitary proportioning and dispensing valve permanently mounted in said collar and forming a part of said container, the top face of said valve being flush with the bottom of said container and having a central chamber opening to said container and having a check valve mounted therein checking the flow of diluting wafer to said container and retaining concentrate within said container, a venturi extending across said valve having a vacuum chamber in communication with said central chamber, said check valve moving to accommodate the passage of concentrate into said vacuum chamber for mixing with aspirating water upon the flow of water through said venturi, a spout leading downwardly from the downstream side of said venturi, and a downwardly opening socket communicating with the upstream side of said venturi for fitting directly over a fitting for aspirating and mixing water, upon the placing of said container within a dispenser.

2. As an article of manufacture, a throw-away concentrate dispensing can having an opening in the bottom thereof with a collar extending downwardly therefrom and having a unitary proportioning and dispensing valve carried thereby and forming a part of said can and collar, the top face of said valve forming a continuation of the bottom of said can and said valve having a central concentrate chamber opening to said top face, a venturi extending across said valve having a vacuum chamber on the downstream side of the throat thereof in communication with said central chamber, said valve also having a spout leading downwardly from the downstream side of said venturi and having a downwardly opening socket communicating with the upstream side of said venturi for engagement with a mixing water fitting upon the placing of said can within a dispenser, and means in said central concentrate chamber normally retaining concentrate within said can comprising a flexible wafer mounted within said concentrate chamber and flexed to close said concentrate chamber, but opening to accommodate the aspiration of concentrate from said concentrate chamber upon the creation of a vacuum within said vacuum chamber.

3. A concentrate container comprising a generally cylindrical can having a flat bottom having an annular collar depending therefrom, a proportioning and dispensing valve body extending within said collar and having said collar rolled into engagement therewith to permanently secure said valve body to said collar, said valve body having a socket for a diluting water connection opening to the bottom thereof and having a downwardly opening spout spaced from said water connection and a venturi having a restricted throat and an enlarged diameter vacuum chamber on the downstream side of said throat connecting said socket with said spout, said valve body also having a central chamber opening to the bottom of the can having communication at its bottom with said vacuum chamber, and a retainer cage and flexible disk carried within said central chamber forming a check valve preventing diluting water from passing to said can and being sufficiently resilient to retain concentrate within said can until flexed by the passage of water through said venturi.

References Cited in the file of this patent

UNITED STATES PATENTS

| | | |
|---|---|---|
| 813,254 | Sweeney | Feb. 20, 1906 |
| 1,144,890 | Calvert | June 29, 1915 |
| 1,288,357 | Wooten | Dec. 17, 1918 |
| 1,748,488 | McCabe | Feb. 25, 1930 |
| 2,216,890 | Philipps | Oct. 8, 1940 |
| 2,601,672 | Gatchet | June 24, 1952 |
| 2,606,068 | Bonacor | Aug. 5, 1952 |